March 21, 1961 W. T. RENTSCHLER 2,975,692
PHOTOGRAPHIC CAMERA
Filed Jan. 21, 1958
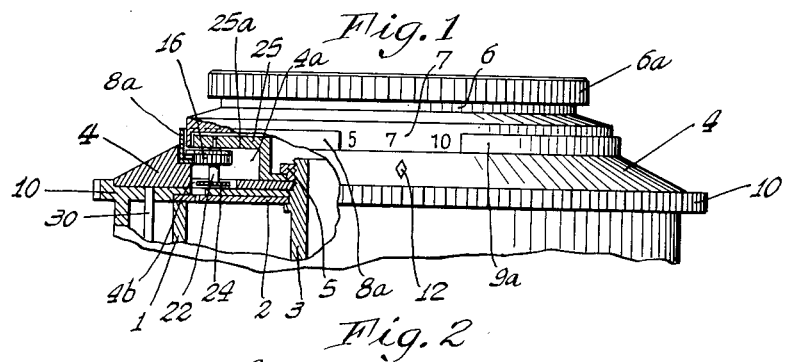
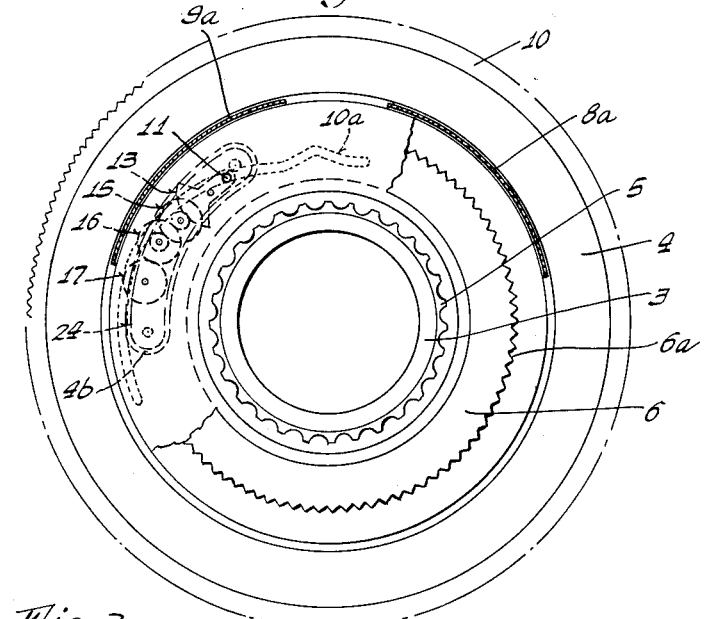
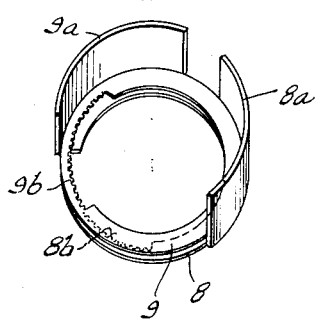
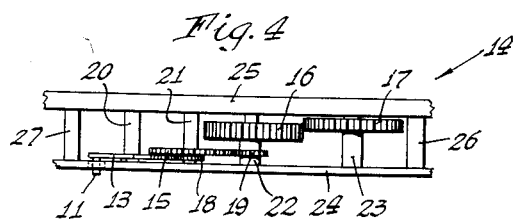
INVENTOR.
Waldemar T. Rentschler
BY
Munn, Liddy, Daniels & March
ATTORNEYS

United States Patent Office 2,975,692
Patented Mar. 21, 1961

2,975,692
PHOTOGRAPHIC CAMERA

Waldemar T. Rentschler, Calmbach (Enz), Germany, assignor to Alfred Gauthier G.m.b.H., Calmbach (Enz), Germany, a corporation of Germany Filed Jan. 21, 1958, Ser. No. 710,279
Claims priority, application Germany Feb. 20, 1957
7 Claims. (Cl. 95—64)

This invention relates to photographic cameras of the type having self-indicating devices for showing the depth of field, and more particularly to such cameras wherein two oppositely movable adjustable rings are provided, actuated in response to movement of the diaphragm setting member and co-operating with a focussing scale.

In present cameras of the above type the diaphragm mechanism is connected to drive the oppositely movable indicator rings by a somewhat complicated system of gearing. This not only makes the construction more difficult, but it also increases the manufacturing cost and places limitations on the related components, often resulting in an inflexible organization.

The above disadvantages and drawbacks of present photographic camera structures having depth-of-field indicators are obviated by the present invention, and one object of the invention is to provide an improved driving or coupling connection between the said oppositely movable indicators and the diaphragm adjustment, which connection is greatly simplified and also relatively small and compact.

Another object of the invention is to provide an improved indicating device for the depth of field in a camera, which device may be readily incorporated in different camera structures, and which does not interfere in any way with the function or structure of the diaphragm mechanism.

In accomplishing the above objects I provide a simple, pre-assembled gear train mechanism having oppositely rotating wheels meshing with internal gear teeth of the indicator rings to actuate the latter, said gear train being driven through a gear segment and cam follower which is made responsive to a control cam connected with the diaphragm mechanism.

With the above construction there is effected an advantageous self-indicating depth-of-field device which is extremely simple and readily adaptable to various different camera structures and diaphragm mechanisms. The advantages of such a depth-of-field indicator are obtained in consequence of actuation of the indicator members or rings through the medium of the control cam shiftable with the diaphragm setting member and the simple intermediate gear train coupling the said cam to the rings. The said cam structure and connection thereof with the gear train, together with the gear ratio of the gear train can be readily developed and adapted for the required conditions. With this organization, therefore, the one device with but slight alterations may be incorporated in cameras having widely different diaphragm adjustments and focal lengths of lenses. The simplicity of the device insures its adaptability to different camera structures.

An especially flexible arrangement and structure may be obtained, with the present device, by providing a cam in the form of a separate transmission member, which is then connected with the diaphragm mechanism.

Where cameras are of the type having lens structures and focussing devices mounted at the front, a compact and simple organization is obtainable by disposing the indicator rings, the gear train, and the cam or transmission member in front of the shutter, preferably in the space covered or defined by the front plate of the shutter structure.

The present invention is adaptable to cameras of the type incorporating a single setting or actuation member to effect diaphragm and speed adjustments, as for example the camera disclosed and claimed in my copending application Serial No. 703,903 filed December 19, 1957, and entitled Photographic Camera. In this copending application various novel arrangements are provided, for effecting an automatic camera setting involving the various factors affecting an exposure, through the use of but a single setting member. The present improved depth-of-field indicator may be economically employed in such a camera, or in others having a single setting member, by incorporating the control cam on such setting member.

Moreover, with the present improved organization a saving of assembly time is made possible by constituting the gear train as a separate unitary assemblage which may be incorporated in the camera in fully assembled condition.

Or, if desired, a saving of components may be effected by mounting the parts of the gear train on a portion of the camera structure, as for example the front plate thereof.

An embodiment of the invention is illustrated in the accompanying drawings, in which:

Fig. 1 is a view partly in side elevation and partly in axial section, of a photographic lens shutter structure incorporating the improved self-indicating depth-of-field device as provided by the invention.

Fig. 2 is a front elevational view of the shutter structure shown in Fig. 1, with a portion of the focussing ring broken away to reveal interior details.

Fig. 3 is a perspective view of the two pointers or indicator rings of the depth-of-field device.

Fig. 4 is a side elevational view, enlarged, of the gear train employed with the depth-of-field indicator shown in Fig. 1.

Referring first to Fig. 1, the side wall of the housing of a photographic lens shutter is indicated at 1. Disposed against the front edge of the side wall 1 there is provided a speed setting ring 2, said ring bearing on the nozzle 3 of a well-known shutter base plate (not shown). The nozzle 3 also mounts a front plate 4, which is held in place by a threaded ring or nut 5 engaged with external threads provided on the nozzle 3.

On the front of the shutter and lens structure there is rotatably mounted a focussing ring 6 adapted to focus the front lens (not shown) in the well-known manner. The ring 6 has a focussing scale 7 which is movable with respect to or referrable to an index mark 12 fixedly carried by the front plate 4.

I provide two indicator rings 8 and 9 which are relatively movable and adapted to cooperate with the focussing scale 7, such rings having pointer marks 8a and 9a respectively, in the form of cover members or shields adapted to cover over portions of said scale. Thus, a self-indication of the depth of field may be had, as governed by the various positions of the rings 8 and 9 and the shields 8a and 9a thereof.

By the present invention, I provide a novel coupling or driving connection for the purpose of actuating the rings 8 and 9 in response to shifting of the diaphragm setting mechanism. This coupling means includes a gear train having oppositely turning gear wheels meshing with internal teeth of the rings, and includes a segment wheel and cam follower, the latter cooperating with a cam by which the gear train is actuated. The said cam is connected with the diaphragm mechanism so as to be moved concurrently therewith.

As illustrated in the drawing, the camera structure is the type wherein setting of the shutter speed and the diaphragm opening is effected in response to actuation of a single setting member, in the form of a ring 10.

This single or master actuation members 10 is also rotatably mounted on the nozzle 3 and is therefore concentric with respect to the speed setting ring 2. The ring 10 is connected with the speed setting ring 2 and the diaphragm mechanism by a well-known drive connection, as for example a pin and slot connection. In the well-known manner every setting position of the ring 10 effects a certain speed-diaphragm proportion and for certain of said proportions the diaphragm aperture remains constant, as by suitable shaping of the diaphragm cam, as is common practice. Thus, adjustment of the diaphragm results from turning the ring 10 through part of its range, for which the diaphragm cam (not shown) is not concentric but eccentric to effect diaphragm adjustment, the said ring for example being connected to the diaphragm mechanism by a connector arm 30 (Fig. 1) engaged with the ring. The connecting arm 30 may be mounted on a diaphragm setting ring (not shown) located at the rear of the shutter. The showing of this diaphragm setting ring has been omitted for the sake of clarity of illustration.

By the present invention, the ring 10 is provided with a cam slot 10a adapted to receive a cam follower or driver pin 11 carried by a gear segment 13. The segment 13 constitutes part of the gear train 14 (Fig. 4) to which belong gears 15, 16, and 17 as well as pinions 18 and 19. The said components of this gear train are disposed between two special bearing plates 24 and 25, being carried by spindles 20, 21, 22, and 23. The bearing plates 24 and 25 are held in spaced relation by posts 26 and 27, in any suitable manner as by screw threads.

By the provision of the cam slot 10a in the setting member 10 there are eliminated additional parts, and space is conserved, especially at the diaphragm mechanism at the rear of the shutter. Moreover, the providing of the cam slot 10a in the single actuation member 10 advantageously places such slot near the focussing ring 6. In this manner, simplicity and economy are effected and a saving of space, by enabling the structure to be made extremely compact.

For the purpose of effecting a driving connection between the gear train 14 and the pointer or indicator rings 8 and 9, said rings are provided with internal toothed segments 8b and 9b respectively, Fig. 3. The segments 8b and 9b engage respectively the gear wheels 16 and 17 of the gear train, which wheels also mesh with each other. The gear 16 thus meshes with the segment 8b and the gear 17 with the segment 9b, driving such segments in opposite directions when the gears turn.

The gear train 14 and rings 8 and 9, as illustrated, are arranged in front of the shutter, thereby to effect a great saving of space. It will be noted that such components are disposed within the space encompassed by the front plate 4, such plate having a recess 4a in which the gear train 14 and rings 8 and 9 are disposed.

In addition to achieving simplicity and saving of space, the above organization enables the shutter to have a compact appearance. Moreover, the components of the device do not interfere with the interior of the shutter, and the overall shutter dimensions need not be different from those of a shutter which does not have the present self-indicating device for depth of field.

As already mentioned, the components of the gear train are disposed between and carried by the special bearing plates 24 and 25. The plate 24 is accommodated in a special recess 4b in the bottom of the front plate 4. As illustrated, the other bearing plate 25 is constituted as the front portion of a ring which is concentrically mounted on the nozzle 3 and fixedly secured thereto by the nut 5.

The bearing plate 25 is seen to have a rear surface 25a facing the other bearing plate 24. As is well understood, a locking pin may secure the nut 5 against loosening.

By the provision of the separate bearing plates 24 and 25 the gear train 14 may be pre-assembled outside of the shutter and afterwards incorporated therein by an easy assembly operation. It is only necessary to engage the cam follower 11 in the cam slot 10a and then fasten the bearing plate 25 by the nut 5.

In order to enable the present depth-of-field indicator to be readily adapted to different camera structures in a simple manner, a separate transmission member may be provided, considering the diaphragm mechanism, to serve as carrier for the control cam. The illustrated embodiment of the invention employs such separate transmission member, considering the diaphragm mechanism, this being the single actuation ring 10 which is of course not part of the diaphragm mechanism but instead coupled thereto.

Thus, particularly in cases where an appreciable dimension exists between the diaphragm and focussing mechanisms, it is possible to incorporate the present improved field depth indicator in a simple manner, without such indicator being dependent on the position of the diaphragm mechanism.

As mentioned above, the separate bearing plates 24 and 25 carry the components of the gear train, and thus the gear train may be pre-assembled as a separate unit, and incorporated as a unit into the shutter structure.

Other arrangements of the various parts and components of the gear train are possible, to effect simplicity and a saving of space. For example, the front plate of the shutter could serve as a bearing plate for the gear train 14.

The operation of the present improved field depth indicator is as follows:

(1) Focussing

The focussing ring 6 may be adjusted, either to the estimated distance or else to the exact distance as determined by a range finder. The scale 7 and index mark 12 are utilized for this purpose.

(2) Setting of the speed-diaphragm proportion corresponding to the prevailing light conditions For this purpose it is only necessary to turn the single actuation member 10 to the proper setting wherein the speed-diaphragm proportion corresponds to the prevailing light conditions.

The depth of field which now results will be indicated between the two opposite side edges of the shields 8a and 9a, referred to the focussing scale 7.

If other light conditions require another speed-diaphragm proportion of the shutter, wherein there is a change in the aperture of the diaphragm, the gear train 14 will be driven by virtue of the cam 10a and pin 11, in response to turning of the single setting ring 10. In consequence, the rings 8 and 9 will be moved in counter directions whereby the shields 8a and 9a thereof indicate a new depth of field on the scale, corresponding to the new diaphragm opening.

If, on the contrary, the single setting ring 10 when being readjusted moves within a partial adjusting range in which only the speed is changed and where the pin 11 occupies the left-most, concentric portion of the slot 10a, there will be no actuation of the gear train 14 by virtue of the pin 11 remaining stationary and not being shifted, and the rings 8 and 9 will thus remain stationary, thus not changing the depth-of-field indication.

The illustrated embodiment of the invention discloses a lens shutter of a photographic camera. The invention is not to be limited to this type of camera, however, since it has utility for other cameras which permit different settings of the diaphragm aperture. Instead of the depthof-field indicator being mounted on the lens shutter, it may be arranged on the camera body itself, or else on a lens structure.

I claim:

1. In a photographic camera having an adjustable diaphragm mechanism and a single actuation member for effecting different exposure values involving related shutter speeds and diaphragm apertures, a field-depth indicator comprising a focussing scale; two movable indicator members adapted to travel over said scale; toothed reduction gear means coupling said indicator members for counter movements; a cam movable with adjustment of the diaphragm mechanism, said cam having a camming edge a portion of which extends substantially along the line of movement of the cam whereby it has no camming function; a cam follower engaged with said camming edge; and means for actuating said toothed reduction gear means in response to movement of the cam follower, thereby to cause counter movements of the indicator members over the focussing scale as the diaphragm mechanism is adjusted by movement of the actuator member, said indicator members being motionless when the follower is at the above-identified portion of the camming edge.

2. The invention as defined in claim 1 in which there is a rotatably movable ring-like part carrying the said cam and constituting a transmission member connected with the diaphragm mechanism.

3. The invention as defined in claim 1 in which the camera is of the type having a shutter speed adjustment and a single actuation member for setting the diaphragm aperture and shutter speed, and in which the said cam is provided on the single actuation member.

4. The invention as defined in claim 1, in which the means for actuating the toothed reduction gear means includes a movement-multiplying gear train coupled to said gear means and actuated directly by the said cam follower.

5. In a photographic camera having an adjustable diaphragm mechanism, a field-depth indicator comprising a focussing scale; two movable indicator members adapted to travel over said scale; toothed reduction gear means coupling said members for counter movements; a cam movable with adjustment of the diaphragm mechanism; a cam follower engaged with said cam; and means for actuating said toothed reduction gear means in response to movement of the cam follower, thereby to cause counter movements of the indicator members over the focussing scale as the diaphragm mechanism is adjusted, said camera being of the type having a lens shutter and a ring-shaped front plate of appreciable axial thickness, disposed in front of said shutter, and the said indicator members having portions in the form of rings turnably mounted with respect to said front plate, said rings, gear means and cam being disposed within an area encompassed by the said front plate.

6. In a photographic camera having an adjustable diaphragm mechanism, a field-depth indicator comprising a focussing scale; two movable indicator members adapted to travel over said scale; toothed reduction gear means coupling said members for counter movements; a cam movable with adjustment of the diaphragm mechanism; a cam follower engaged with said cam; and means for actuating said toothed reduction gear means in response to movement of the cam follower, thereby to cause counter movements of the indicator members over the focussing scale as the diaphragm mechanism is adjusted, the said gear means and means responsive to movement of the cam follower comprising a gear train assembly constituted as a separate unit, adapted to be incorporated as such into the said camera.

7. In a photographic camera having an adjustable diaphragm mechanism, a field-depth indicator comprising a focussing scale; two movable indicator members adapted to travel over said scale; toothed reduction gear means coupling said members for counter movements; a cam movable with adjustment of the diaphragm mechanism; a cam follower engaged with said cam; and means for actuating said toothed reduction gear means in response to movement of the cam follower, thereby to cause counter movements of the indicator members over the focussing scale as the diaphragm mechanism is adjusted, said camera being of the type having a lens shutter and a ring-shaped front plate of appreciable axial thickness, disposed in front of said shutter, and the said indicator members having portions in the form of rings turnably mounted with respect to said front plate, said rings, gear means, and cam being disposed within an area encompassed by the said front plate, the said gear means comprising a gear train including wheels and shafts carrying the wheels, said shafts being mounted for rotation within and with respect to the said front plate.

References Cited in the file of this patent

UNITED STATES PATENTS

| 2,315,977 | Mihalyi | Apr. 6, 1943 |
| 2,342,819 | Priesmann | Feb. 29, 1944 |
| 2,350,009 | Babcock et al. | May 30, 1944 |

FOREIGN PATENTS

| 139,562 | Austria | Nov. 26, 1934 |
| 1,111,448 | France | Feb. 27, 1956 |